(12) United States Patent
Kumeuchi et al.

(10) Patent No.: US 8,049,463 B2
(45) Date of Patent: Nov. 1, 2011

(54) STACKED BATTERY MODULE AND BATTERY PACK

(75) Inventors: Tomokazu Kumeuchi, Sendai (JP); Koichi Zama, Sendai (JP); Isao Tochihara, Sendai (JP); Izumi Tanaka, Sendai (JP)

(73) Assignee: NEC Energy Devices, Ltd., Sagamihara-shi, Kanagawa (JP)

( * ) Notice: Subject to any disclaimer, the term of this patent is extended or adjusted under 35 U.S.C. 154(b) by 403 days.

(21) Appl. No.: 11/604,239

(22) Filed: Nov. 27, 2006

(65) Prior Publication Data

US 2007/0120526 A1   May 31, 2007

(30) Foreign Application Priority Data

Nov. 28, 2005   (JP) .................................. 2005-342047
Nov. 22, 2006   (JP) .................................. 2006-316361

(51) Int. Cl.
*H02J 7/00* (2006.01)
(52) U.S. Cl. ....... 320/116; 320/107; 320/150; 361/93.8; 361/103
(58) Field of Classification Search .................. 320/107; 429/7, 126; 361/93.8, 103, 124
See application file for complete search history.

(56) References Cited

U.S. PATENT DOCUMENTS

| | | | | |
|---|---|---|---|---|
| 5,853,908 | A * | 12/1998 | Okutoh | 429/7 |
| 6,038,473 | A * | 3/2000 | Olson et al. | 607/5 |
| 6,246,217 | B1 * | 6/2001 | Yoshida et al. | 320/150 |
| 6,455,190 | B1 * | 9/2002 | Inoue et al. | 429/160 |
| 6,608,470 | B1 * | 8/2003 | Oglesbee et al. | 320/136 |
| 7,106,165 | B2 * | 9/2006 | Mukai et al. | 337/405 |
| 7,474,076 | B2 * | 1/2009 | Kim | 320/112 |
| 2001/0038938 | A1 * | 11/2001 | Takahashi et al. | 429/53 |
| 2004/0119442 | A1 * | 6/2004 | Lee et al. | 320/112 |
| 2006/0076923 | A1 * | 4/2006 | Eaves | 320/112 |
| 2007/0009797 | A1 * | 1/2007 | Takami et al. | 429/231.1 |

* cited by examiner

*Primary Examiner* — Arun Williams
(74) *Attorney, Agent, or Firm* — Westerman, Hattori, Daniels & Adrian, LLP

(57) ABSTRACT

A stacked battery module or a battery pack is formed by laying a plurality of unit batteries of non-aqueous electrolyte batteries in layers with the surfaces thereof having a large area disposed vis-à-vis and electrically connecting them in series and a temperature fuse is arranged in the central part of the stacked battery module with one of its terminals connected to either the positive electrode terminal or the negative electrode terminal of the stacked battery module while the other terminal connected to a charging terminal for supplying a charging current in a charging operation. One of the terminals of the stacked battery module is connected to a discharging terminal for taking out a discharging current in a discharging operation and the other terminal of the stacked battery module is a common terminal for charging and discharging operations.

10 Claims, 6 Drawing Sheets

STACKED BATTERY MODULE AND BATTERY PACK

CROSS-REFERENCE TO RELATD APPLICATIONS

This application is based upon and claims the benefit of priority from prior Japanese Patent Application No. 2005-342047, filed Nov. 28, 2005 and Japanese Patent Application No. 2006-316361, filed Nov. 22, 2006 the entire contents of which are incorporated herein by reference.

BACKGROUND OF THE INVENTION

1. Technical Field

This invention relates to a stacked battery module formed by connecting non-aqueous electrolyte secondary batteries in series. The present invention also relates to an assembly of stacked battery module formed by connecting a plurality of such stacked battery module in series or in parallel and a battery pack formed from such stacked battery module. Particularly, the present invention relates to a stacked battery module, an assembly of stacked battery module and a battery pack of non-aqueous electrolyte batteries such as lithium ion secondary batteries showing a high energy density, for which a charging operation can be stopped before the security thereof is damaged by some abnormality that arises during the charging operation.

2. Related Art

Lithium ion secondary batteries are being popularly used in mobile phones, notebook-sized personal computers, camcorders, etc. because they provide an energy density higher than other secondary batteries such as nickel cadmium batteries and nickel hydride batteries. Additionally, lithium ion secondary batteries are finding applications as power sources for electric tools and uninterruptible power supplies and as main or auxiliary power sources for bicycles and automobiles.

A lithium ion secondary battery comprises a negative electrode made of a material such as carbon adapted to dope/dedope lithium ions and a positive electrode made of a transition metal oxide containing lithium such as lithium cobalt oxide, lithium nickel oxide or lithium manganese oxide. A non-aqueous electrolyte obtained by dissolving lithium salt such as $LiPF_6$ is used as the electrolyte of the lithium ion secondary battery.

Lithium ion secondary batteries are provided with a protection circuit for avoiding an overcharged state because the internal pressure of the battery can rise and/or heat generation can take place to damage the battery due to deposition of lithium and/or decomposition of non-aqueous electrolyte when the battery is overcharged.

A stacked battery module formed by connecting a plurality of lithium ion secondary batteries in series and a battery pack formed by using such stacked battery modules are charged by applying the total charging voltage, which is the sum of the charging voltages of the unit batteries of the stacked battery module formed by connecting the unit batteries in series. However, if there is a unit battery whose impedance has risen or whose capacity has fallen for some reason or another in the stacked battery module, the unit battery whose impedance has risen or whose capacity has fallen can get into an overcharged state. Thus, each unit battery has to be controlled for the charging voltage by means of a protection circuit. Various techniques have been proposed to date to control the charging voltage.

The techniques that have been proposed so far include one for detecting both the abnormally overcharged battery, if any, and the abnormal condition of the charger of a battery that is formed by connecting battery units in series, each of which battery units has one or more than one unit batteries connected in series (see, for example, JP-A-11-98702) and one for using a charging circuit that can fully charge all the unit batteries connected in series while preventing them from being overcharged (see, for example, JP-A-2000-92731, JP-A-2000-50516).

Thus, the use of a protection circuit for monitoring each unit battery and preventing it from falling into an overcharged state is indispensable when lithium secondary batteries are connected in series and when a plurality of lithium secondary batteries are connected in parallel for use. However, an overcharged state can arise to endanger the stacked battery module when an abnormal condition takes place in the protection circuit that operates at the time of charging the lithium secondary batteries.

In view of the above identified circumstances, it is therefore the object of the present invention to provide a battery laminate formed by connecting a plurality of unit batteries using non-aqueous electrolyte such as lithium ion secondary batteries in series or connecting a plurality of unit battery groups formed by connecting unit batteries in series in parallel and a battery pack formed by using such stacked battery modules that can prevent from falling into a dangerous condition even when the protection circuit of the charging apparatus falls into an abnormal condition to give rise to an overcharged state.

SUMMARY OF THE INVENTION

In an aspect of the present invention, there is provided a stacked battery module formed by laying a plurality of unit batteries of non-aqueous electrolyte batteries in layers with the surfaces thereof having a large area disposed vis-à-vis and electrically connecting them in series; a temperature fuse being arranged in the central part of the stacked battery module with one of its terminals connected to either the positive electrode terminal or the negative electrode terminal of the stacked battery module and the other terminal connected to a charging terminal for supplying a charging current in a charging operation; one of the terminals of the stacked battery module being connected to a discharging terminal for taking out a discharging current in a discharging operation, the other terminal of the stacked battery module being a common terminal for charging and discharging operations.

In a stacked battery module as defined above, the temperature fuse is arranged in a temperature fuse mount arranged between the oppositely disposed surfaces of layers of unit batteries.

In a stacked battery module as defined above, the temperature fuse is activated at a temperature level higher than 70° C. but lower than the melting temperature of the separator of the battery laminate by 60° C.

In a stacked battery module as defined above, the unit batteries are covered and hermetically sealed by flexible film.

In a stacked battery module as defined above, the unit batteries are lithium ion secondary batteries.

In a stacked battery module as defined above, the separator for separating the positive electrode and the negative electrode is a single layer of polypropylene or a three-layered structure of polypropylene, polyethylene and polypropylene.

In a stacked battery module as defined above, the lithium ion secondary batteries contain lithium-manganese complex oxide as positive active material.

In another aspect of the present invention, there is provided a battery pack formed by holding at least a stacked battery module by means of a plate-shaped body at the opposite ends thereof; the battery laminate being formed by laying a plurality of unit batteries of non-aqueous electrolyte batteries in layers with the surfaces thereof having a large area disposed vis-à-vis and electrically connecting them in series; a temperature fuse being arranged in the central part of the stacked battery module with one of its terminals connected to either the positive electrode terminal or the negative electrode terminal of the battery laminate and the other terminal connected to a charging terminal for supplying a charging current in a charging operation; one of the terminals of the stacked battery module being connected to a discharging terminal for taking out a discharging current in a discharging operation, the other terminal of the stacked battery module being a common terminal for both charging and discharging operations.

A battery pack as defined above further comprises a discharging means for discharging the charging energy of the batteries after the activation of the temperature fuse.

In a battery pack as defined above, two stacked battery modules are connected in series, one of the stacked battery modules being connected to the temperature fuse at the positive electrode terminal thereof, the other stacked battery module being connected to the temperature fuse at the negative electrode terminal thereof.

In a battery pack as defined above, stacked battery modules connected to the temperature fuse at the positive electrode terminal thereof and stacked battery module connected to the temperature fuse at the negative electrode terminal thereof are arranged alternately, the common terminal of the stacked battery module arranged at an end is connected to the common terminal of the adjacently arranged stacked battery module so as to sequentially connect the charging terminals and the discharging terminals or the common terminals of adjacently arranged stacked battery modules, and a charging/discharging switching means for switching from a charging operation to a discharging operation and vice versa is provided at the spot for connecting the charging terminals and the discharging terminals.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1A:
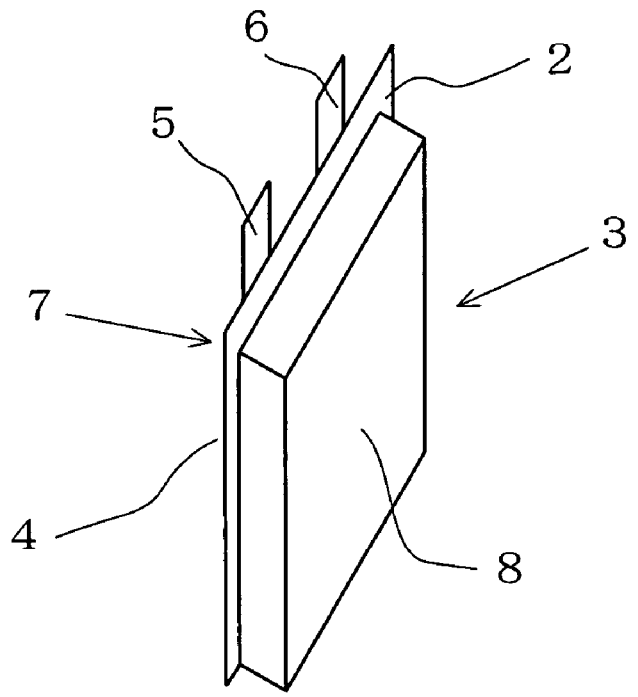
FIG. 1A is a schematic perspective view of a unit battery that can be used to form a stacked battery module according to the present invention.

As a result of intensive efforts, the inventor of the present invention found that it is possible to completely prevent a stacked battery module and an assembly of stacked battery modules, or a battery pack, from being endangered even if the protection means falls into an abnormal condition in a charging operation when a charging circuit and a discharging circuit are formed separately and a temperature fuse is arranged in the charging circuit at the central part of the stacked battery module that is formed by laying a plurality of unit batteries of non-aqueous electrolyte batteries in layers with the surfaces thereof having a large area disposed vis-à-vis and electrically connecting them in series. The present invention is based on this finding.

Unit batteries that can be charged with and discharge a large electric current are generally formed as flat rectangular parallelepipeds and a stacked battery module is formed by laying such unit batteries in layers with the surfaces thereof having a large area disposed vis-à-vis. If the charging protection means arranged in the charging circuit for charging the stacked battery module falls in an abnormal condition and an overcharged state of the stacked battery module continues, the unit batteries of the battery laminate emit heat to a large extent. Particularly, the unit batteries arranged in the central part of the stacked battery module with the surfaces thereof having a large area disposed vis-à-vis can discharge heat only to a small extent if compared with the unit batteries arranged at and in the vicinity of the opposite ends of the stacked battery module so that their temperature rise will be remarkable.

The inventor of the present invention paid attention to the fact that the unit batteries arranged in the central part of the stacked battery module show a large temperature rise. Thus, according to the present invention, a temperature fuse is arranged in the central part of the stacked battery module and only the charging current is supplied by way of the temperature fuse to prevent the stacked battery module from being endangered by an abnormal condition that can arise in a charging operation.

For the purpose of the present invention, when the number of unit batteries of the stacked battery module is 2n or 2n+1 (where n is a natural number), the central part of the stacked battery module refers to the position between the n−1-th battery and the n+1-th battery from an end or between the oppositely disposed surfaces of the unit batteries before or after either of them. In other words, the central part does not mean the middle point between the opposite ends of the module in a rigorous sense of the words.

The temperature fuse can be activated quickly in response to a temperature rise in the stacked battery module when it is arranged at a central part of the oppositely disposed surfaces of the unit batteries located at the central part of the battery laminate.

In a stacked battery module according to the present invention, the unit batteries may be formed by using a metal can or a flexible laminate film of synthetic resin film and metal foil as coat.

Particularly, when the unit batteries are formed by using flexible film as coat, the coat shows a small thickness and a small mass if compared with a metal can. Therefore, the volume and the mass of a stacked battery module can be reduced by using such a coat when manufacturing a stacked battery module by laying a large number of unit batteries in layers. Then, such a stacked battery module shows a large energy density.

However, unit batteries formed by using flexible film as coat are accompanied by a problem of being liable to be influenced by expansion that arises due to the gas generated by a temperature rise or an overcharged state if compared with unit batteries formed by using a metal can as coat when an abnormal condition occurs in the protection circuit of the charging apparatus and an overcharged state occurs.

While a non-aqueous electrolyte battery sealed by a flexible coat is described below, a non-aqueous electrolyte battery sealed by a metal coat can also be formed in a similar manner.

Now, the present invention will be described further by referring to the accompanying drawings.

FIG. 1A is a schematic perspective view of a unit battery that can be used to form a stacked battery module according to the present invention.

Referring to FIG. 1, the unit battery 1 is covered by a flexible coat 2 which is made of synthetic resin film or a laminate of synthetic resin film and aluminum foil, for example a polypropylene/aluminum/nylon laminate film.

The unit battery 1 includes a containing section 3 for a battery element fitted to one of the surfaces of the coat and formed by embossing. The other side is covered by a flat member 4.

A positive electrode terminal 5 and a negative electrode terminal 6 are thermally melt-bonded to and sealed by the flat member 4 and a member arranged at the side of the containing section 3 for the battery element and led to the outside.

The battery element has a flat profile and a pair of surfaces showing a large area and arranged at the side facing the containing section containing the battery element and at the side opposite to it so as to be laid on and under adjacent unit batteries. In other words, the unit battery has outer layering surfaces 7 and 8 that run in parallel with each other.

Figure 1B:
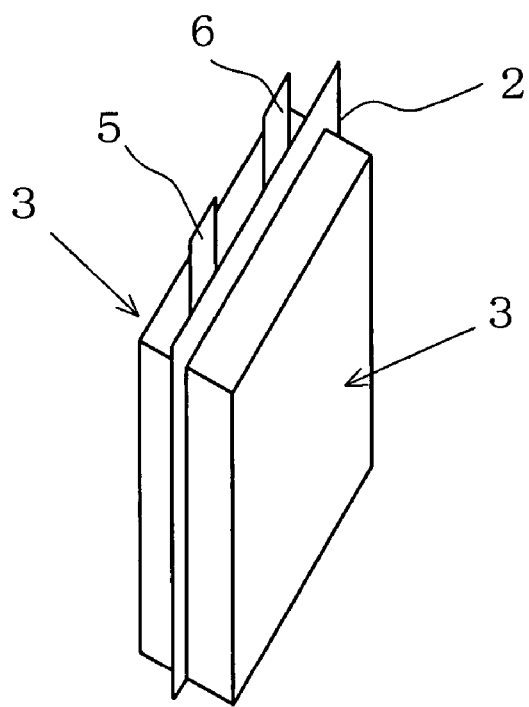
FIG. 1B is a schematic perspective view of another unit battery that can be used to form a stacked battery module according to the present invention.

FIG. 1B is a schematic perspective view of another unit battery that can be used to form a stacked battery module according to the present invention.

The unit battery 1 illustrated in FIG. 1B includes two containing sections 3 fitted respectively to the opposite surfaces of a flexible coat 2. The flexible coat 2 is thermally melt-bonded to and sealed by the peripheries of the containing sections and a positive electrode terminal 5 and a negative electrode terminal 6 are led to the outside from the sealed section of the flexible coat. Otherwise, the unit battery 1 of FIG. 1B is identical with the unit battery 1 of FIG. 1A in terms of configuration.

Figure 2:
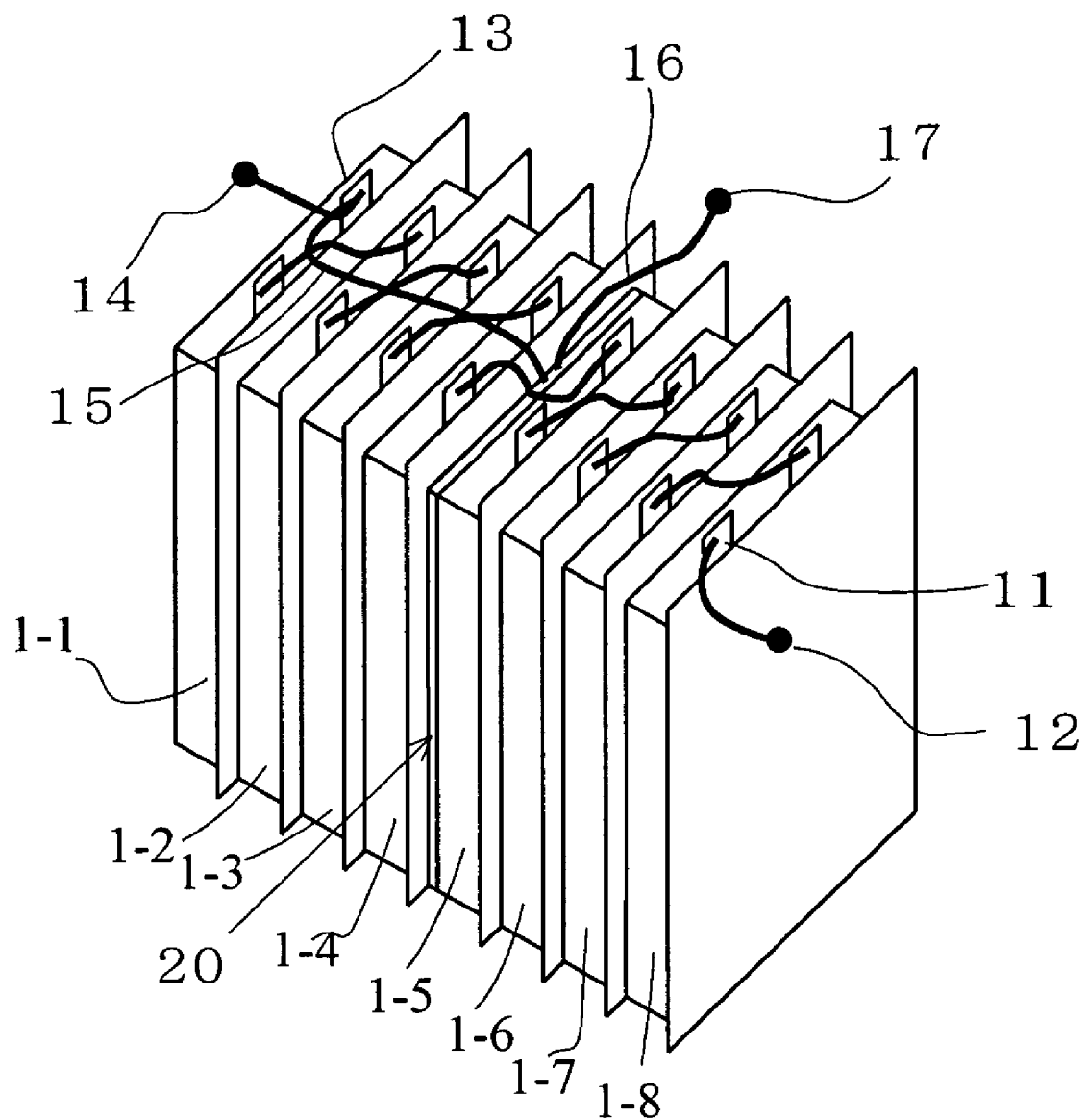
FIG. 2 is a schematic perspective view of an embodiment of stacked battery module according to the present invention.

FIG. 2 is a schematic perspective view of an embodiment of stacked battery module according to the present invention.

The battery laminate 10 illustrated in FIG. 2 is formed by laying eight unit batteries 1 one on the other. More specifically, the battery laminate 10 is formed firstly by laying four unit batteries one on the other at the surfaces thereof having the largest area in a direction, arranging a temperature fuse mount 20 and then laying other four unit batteries in a similar manner.

As the temperature fuse mount 20 is arranged between the corresponding layering surfaces of unit batteries, the pressure applied to the unit batteries can be uniformly distributed if compared with a case where only a temperature fuse is arranged.

Then, the positive electrode terminals and the negative electrode terminals of the unit batteries 1-1 through 1-4 and 1-5 through 1-8 are connected in series and the negative electrode terminal 11 at an end is made to operate as common terminal 12 to be commonly used for both charging and discharging operations.

A temperature fuse connecting lead wire 15 is connected to both the positive electrode terminal 13 located at an end of the battery laminate and the discharging terminal 14 that is connected to the discharging circuit. The temperature fuse connecting lead wire 15 is bonded to the temperature fuse (not shown) arranged in the inside of the temperature fuse mount 20 and a charging circuit connecting lead wire 16 is taken out from the temperature fuse and a charging terminal 17 for supplying a charging current in a charging operation is formed on the charging circuit connecting lead wire 16.

In a charging operation, a charging current is supplied to the common terminal 12 and the charging terminal 17 to charge the stacked battery module 10 with electricity. In a discharging operation, a discharging current is taken out from the common terminal 12 and the discharging terminal 14.

When the charging protection means falls into an abnormal condition to give rise to an overcharged state in a charging operation, the temperature of the central part of the stacked battery module 10 rises remarkably to melt and break the temperature fuse arranged in the temperature fuse mount 20. Then, consequently, the charging current is intercepted to by turn stop the charging operation.

When the temperature fuse is activated by the temperature rise in a charging operation, some of the unit batteries may have fallen into an abnormal condition due to overcharging. Therefore, the stacked battery module may preferably be equipped with a means for detecting the actuation of the temperature fuse and a battery discharging means for discharging the charged energy that is accumulated in the batteries.

Figure 3:
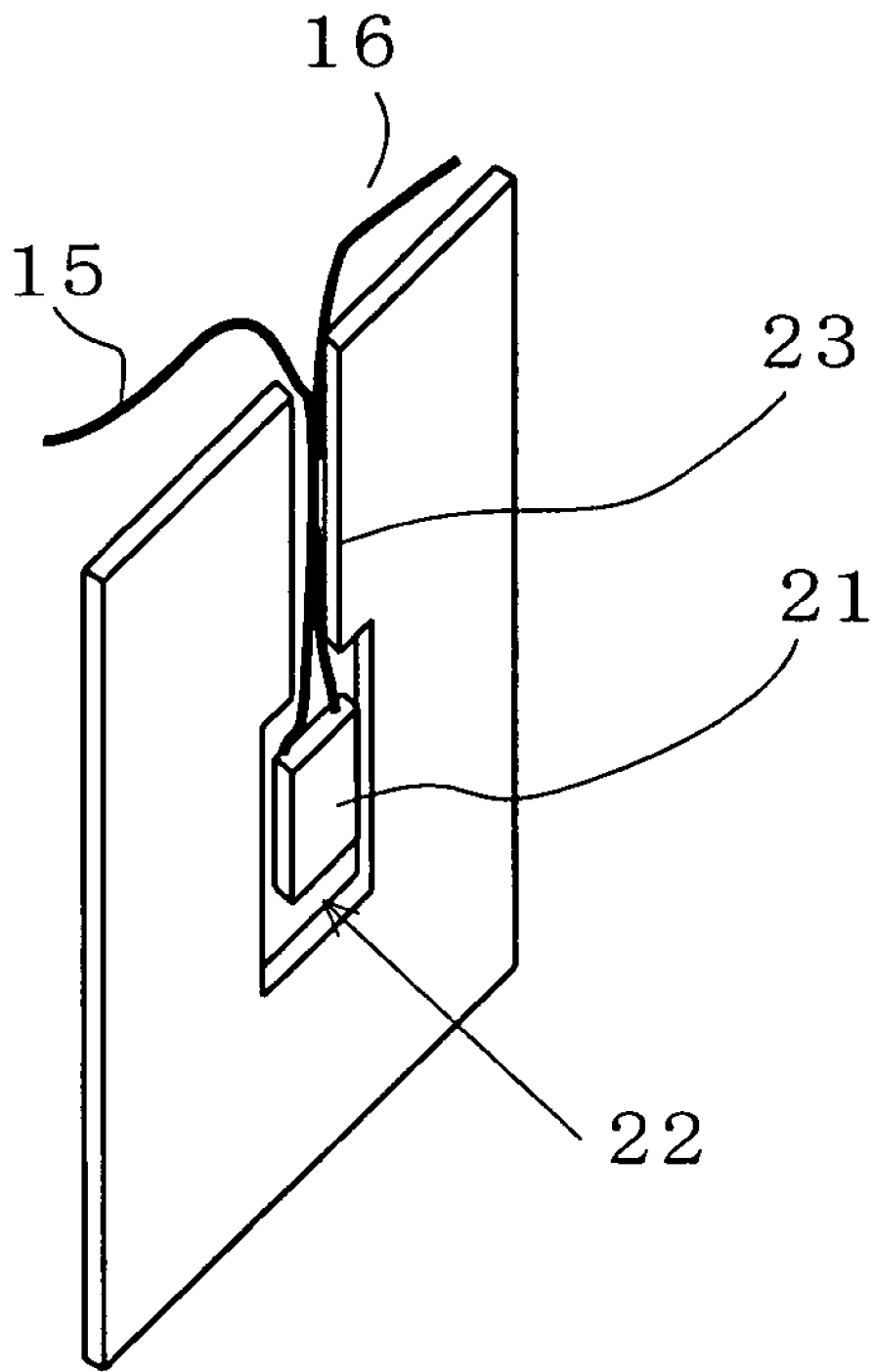
FIG. 3 is a schematic perspective view of a temperature fuse mount that can be used for a stacked battery module according to the present invention.

FIG. 3 is a schematic perspective view of a temperature fuse and a temperature fuse mount that can be used for a battery laminate according to the present invention.

Referring to FIG. 3, the temperature fuse mount 20 is made of a plate having a size same as the layering surfaces of a unit battery and provided at the central part thereof with a temperature fuse containing section 22 for containing a temperature fuse 21. A temperature fuse connecting lead wire 15 and a charging circuit connecting lead wire 16 are connected to the temperature fuse 21 and taken out to the outside by way of a lead wire path 23 for electrical conduction and connection. The plate of the temperature fuse mount 20 may be made of heat resistant metal or synthetic resin.

The activation temperature of the temperature fuse is preferably such that the temperature fuse is not activated by the temperature rise that takes place when the stacked battery module is operated normally. Additionally, the activation temperature of the temperature fuse is sufficiently lower than the melting temperature of the separator of the non-aqueous electrolyte batteries. More specifically, the temperature fuse is preferably activated at a temperature level higher than 70° C. but lower than the melting temperature of the separator of the stacked battery module by 60° C.

For the purpose of the present invention, the melting temperature of the separator refers to the temperature at which the separator is softened due to the temperature rise and vitrified so that the separator no longer operate properly to isolate the positive electrode and the negative electrode from each other.

Figure 4:
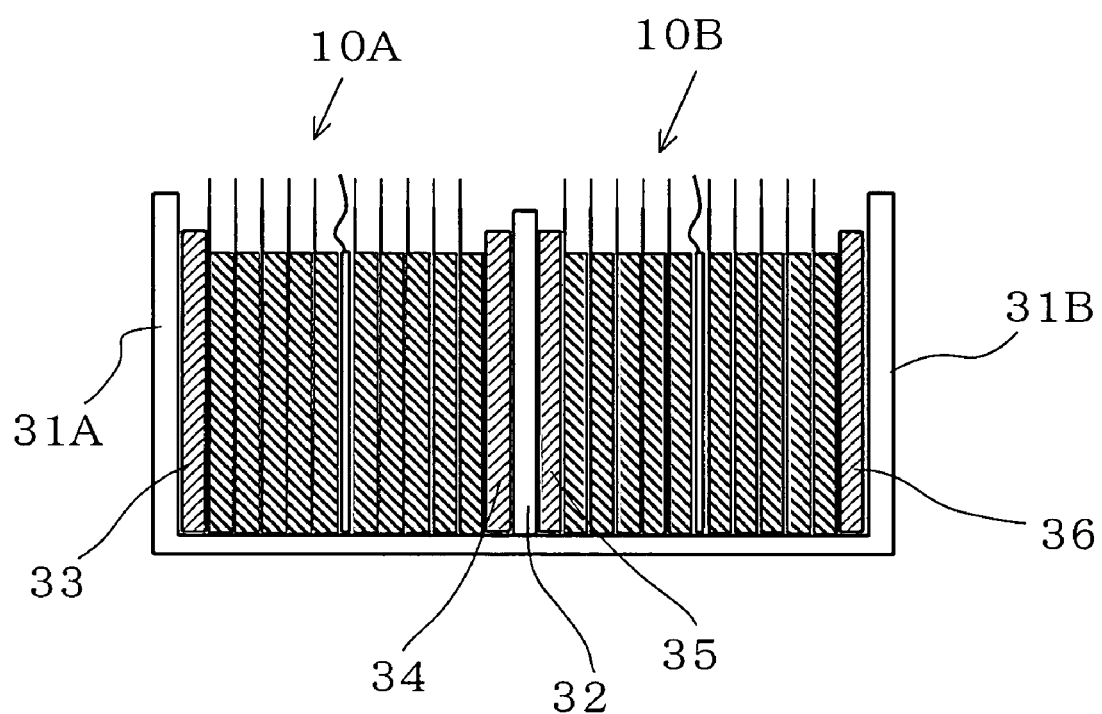
FIG. 4 is a schematic cross sectional view of a battery pack comprising stacked battery modules according to the present invention, illustrating how the stacked battery modules are formed by laying batteries one on the other.

FIG. 4 is a schematic cross sectional view of a battery pack comprising stacked battery modules according to the present invention, illustrating how the stacked battery modules are formed by laying batteries one on the other.

Referring to FIG. 4, the battery pack 30 comprises two stacked battery modules 10A, 10B. More specifically, end plates 33 and 34 are arranged in the inside and respectively along an outer wall 31A and a fixed wall 32 and the stacked battery module 10A is arranged in the space defined by the two end plates.

Similarly, end plates 35 and 36 are arranged in the inside and respectively along an outer wall 31B and the fixed wall 32 and the stacked battery module 10B is arranged in the space defined by the two end plates.

The end plates are formed by using elastic members so that the stacked battery modules are held stably and the battery pack 30 can accommodate the expansion and the contraction that arise when in charging and discharging operations.

While a stacked battery module can be made to produce a desired voltage by appropriately selecting the number of unit batteries, a plurality of stacked battery module may be connected in series or in parallel so that the voltage and the electric current capacity may be regulated to a desired level.

Figure 5:
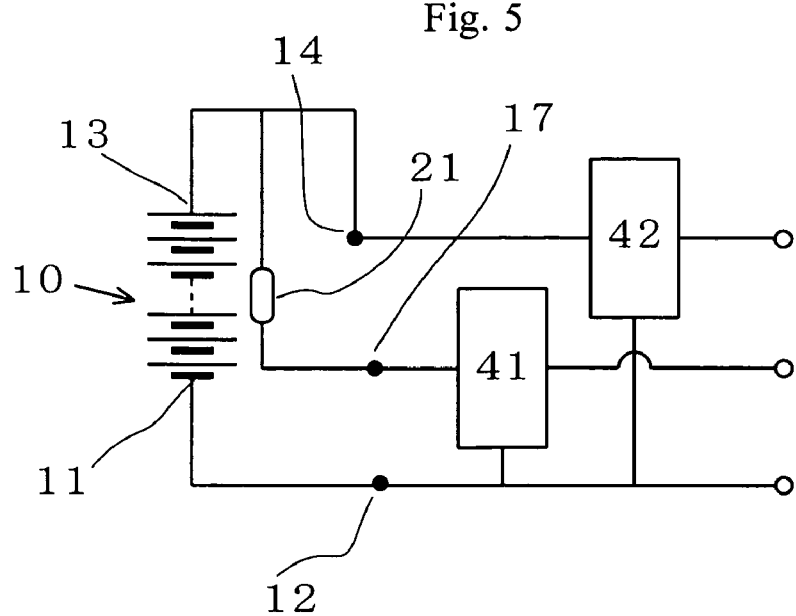
FIG. 5 is a circuit diagram of a stacked battery module according to the present invention.

FIG. 5 is a circuit diagram of a stacked battery module according to the present invention.

Referring to FIG. 5, the positive electrode terminal 13 arranged at one of the opposite ends of the stacked battery module 10 is connected to the temperature fuse 21, which is by turn connected to the charging terminal 17 by way of which a charging current is supplied. The positive electrode terminal 13 is also connected to the discharging terminal 14 for supplying a discharging current.

The stacked battery module 10 also has the common terminal 12 that is connected to the negative electrode terminal 11 arranged at the opposite end of the stacked battery module 10.

In a charging operation, a charging current is supplied from a charging control means 41 and the stacked battery module 10 is electrically charged by way of the charging terminal 17 and the temperature fuse 21. In a discharging operation, an electric current is taken out from the stacked battery module 10 by way of the discharging terminal 14 and a discharging control means 42.

As described above, an electric current flows through the temperature fuse that is mounted in the stacked battery module only when in a charging operation of electrically charging the stacked battery module.

Figure 6:
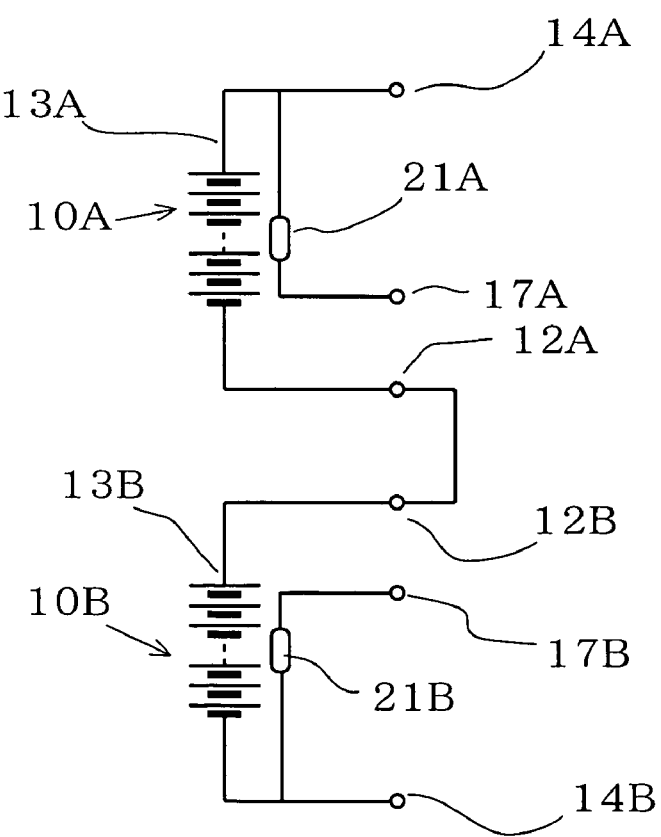
FIG. 6 is a circuit diagram of two stacked battery modules connected in series.

FIG. 6 is a circuit diagram of two stacked battery modules connected in series.

Referring to FIG. 6, the temperature fuse 21A is connected to the positive electrode terminal 13A of the first stacked battery module 10A and the charging terminal 17A and the discharging terminal 14A are arranged at the positive electrode side, while the common terminal 12A is arranged at the negative electrode side as described above by referring to FIG. 6.

On the other hand, the common terminal 12B is arranged at the positive electrode 13B while the temperature fuse 21B is connected at an end thereof to the negative electrode terminal 11 and at the other end thereof to the charging terminal 17B in the second stacked battery module 10B that is connected to the first stacked battery module 10A in series. The discharging terminal 14B is connected to the negative electrode terminal.

The first stacked battery module 10A and the second stacked battery module 10B are connected to each other in series by way of their common terminals. A charging current is supplied from the charging terminal 17A and the charging terminal 17B in a charging operation and a discharging current is taken out from the discharging terminals 14A and 14B in a discharging operation.

Thus, a battery pack where a large number of unit batteries are connected in series is obtained by alternately arranging the stacked battery modules 10A where a temperature fuse is connected to the positive electrode terminal and the stacked battery modules 10B where a temperature fuse is connected to the negative electrode terminal and connecting them in series.

When connecting three stacked battery modules in series, the common terminal of the first stacked battery module arranged at an end is connected to the common terminal of the second stacked battery module whose polarity differs from that of the charging terminal arranged at the end and the charging terminal and the discharging terminal of the second stacked battery module are connected to the charging terminal and the discharging terminal of the third stacked battery module.

When connecting four or more than four stacked battery modules in series, stacked battery modules whose charging terminals show different polarities are arranged alternately and the common terminals are connected to each other while the charging terminals and the discharging terminals are connected to each other repeatedly.

However, when three or more than three stacked battery modules are arranged alternately and the charging terminals are connected to each other while the discharging terminals are connected to each other, it is no longer possible to separate the charging current and the discharging current. Therefore, a charging/discharging switching means needs to be provided to switch from a charging operation to a discharging operation and vice versa.

Figure 7:
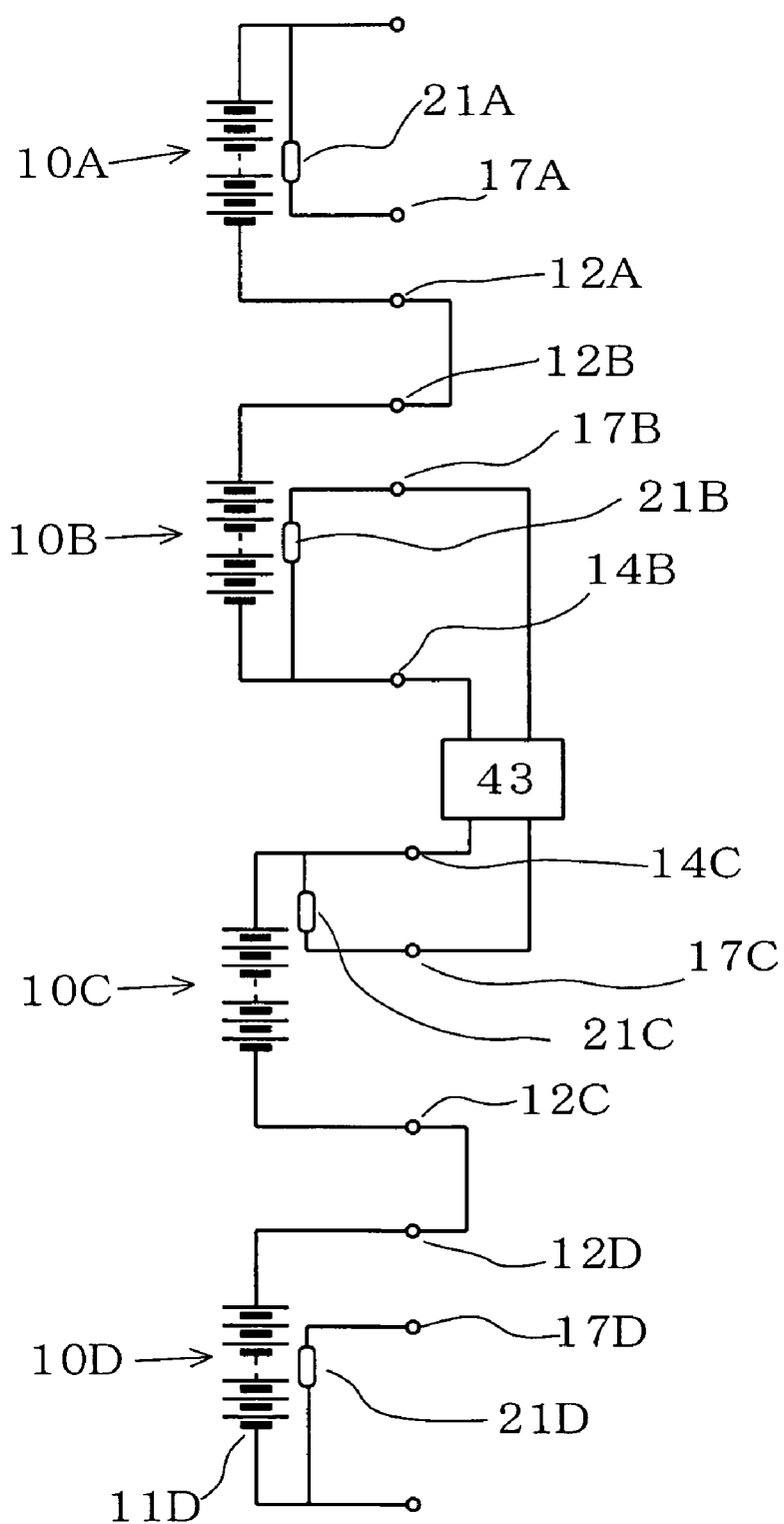
FIG. 7 is a circuit diagram of four stacked battery modules connected in series.

FIG. 7 is a circuit diagram of four stacked battery modules connected in series.

Referring to FIG. 6, a temperature fuse 21A is connected to the positive electrode terminal of the first stacked battery module 10A while another temperature fuse 21B is connected to the negative electrode terminal of the second stacked battery module 10B and the common terminals 12A and 12B of the two stacked battery modules are connected to each other. Then, the discharging terminal 14B and the charging terminal 17B, which is connected to the temperature fuse, of the second stacked battery module 12B are connected to a charging/discharging switching means 43.

On the other hand, the discharging terminal 14C and the charging terminal 17C of the third stacked battery module 10C, whose positive electrode terminal is connected to a temperature fuse 21C, are also connected to the charging/discharging switching means 43.

The common terminal 12C of the third stacked battery module 10C is connected to the common terminal 12D of the fourth stacked battery module 10D, whose negative electrode terminal is connected to a temperature fuse 21D.

Then, the charging/discharging switching means 43 is switched in such a manner that only the circuit section between the charging terminals 17B and 17C is made electrically conductive in a charging operation whereas only the circuit section between the discharging terminals 14B and 14C are made electrically conductive in a discharging operation. Thus, a charging current is supplied from the charging terminal 17A and the charging terminal 17D.

Then, after switching the charging/discharging switching means 43, a discharging current can be taken out from the discharging terminal 14A and the discharging terminal 14D.

When a non-aqueous electrolyte battery according to the present invention is a lithium ion secondary battery, the use of lithium-manganese complex oxide is preferable for the positive active material.

Lithium-manganese complex oxide shows a mild exothermic phenomenon in an abnormal condition that can arise in a charging operation if compared with lithium-cobalt complex oxide. Therefore, lithium-manganese complex oxide provides a high degree of freedom for designing a member for forming a unit battery such as a battery separator and electrolyte and a temperature fuse.

Particularly, when metal lithium is used for the opposite electrode, lithium-manganese complex oxide is preferably selected from the composition formula of $Li_{1+x}Mn_{2-x-y}M_yO_{4-z}$ ($0.03 \leq x \leq 0.16$, $0 \leq y \leq 0.1$, $-0.1 \leq z \leq 0.1$, M=a metal selected from Mg, Al, Ti, Co and Ni) that shows an electric potential of about 4V.

The lithium-manganese complex oxide shows a particle profile, a particle size distribution, an average particle diameter, a specific surface area and a true density that make the positive electrode density of the part obtained by removing the metal foil of the collector not less than 2.8 g/cc. Additionally, the positive combination agent formed from a positive active material, a binder, an electric conductibility providing agent and so on shows a particle profile, a particle size distribution, an average particle diameter, a specific surface area and a true density that makes the positive active material take not less than 80% in terms of weight ratio.

While $Li_2CO_3$, LiOH, $Li_2O$ and $Li_2SO_4$ can be used as sources of lithium to be used for $Li_{1+x}Mn_{2-x-y}M_yO_{4-z}$ ($0.03 \leq x \leq 0.16$, $0 \leq y \leq 0.1$, $-0.1 \leq z \leq 0.1$, M=a metal selected from Mg, Al, Ti, Co and Ni), such sources of lithium preferably show the largest particle diameter of not greater than 2 µm from the viewpoint of the reactivity with an Mn source and improving the crystallinity of the synthesized lithium-manganese oxide. While $MnO_2$, $Mn_2O_3$, $Mn_3O_4$, MnOOH, $MnCO_3$ and $Mn(NO_3)_2$ can be used as sources of manganese, such sources of manganese preferably show the largest particle diameter of not greater than 30 µm. Of the above listed sources, $Li_2CO_3$ is most preferable as lithium source and $MnO_2$, $Mn_2O_3$ or $Mn_3O_4$ is most preferable as manganese source from the viewpoint of cost and ease of handling and obtaining an active material showing a high filling property.

The lithium source and the manganese source are weighed and mixed to show a predetermined metal composition ratio. The largest particle diameter of the lithium source is preferably not greater than 2 µm, while the largest particle diameter of the manganese source is preferably not greater than 30 µm in order to make the lithium source and the manganese source show a good reactivity and avoid producing residual hetero $Mn_2O_3$. An apparatus appropriately selected from a ball mill, a V-type mixer, a cutter mixer or a shaker may be used for mixing the two sources. The obtained powdery mixture is preferably baked in a temperature range between 600° C. and 950° C. and in an atmosphere showing an oxygen partial pressure not lower than the oxygen partial pressure of air.

The specific surface area of the obtained lithium-containing complex oxide is preferably not greater than 1.5 $m^2$/g, more preferably not greater than 0.8 $m^2$/g. When the specific surface area is greater than 1.5 $m^2$/g, it is not possible to produce a battery showing a high energy density because of the required large quantity of binder and the rate at which manganese is eluted into the electrolyte increases. At the same time, the reactivity with the electrolyte rises to actively degrade the electrolyte at high temperature.

Lithium-nickel complex oxide doped with cobalt may be compounded with the lithium-manganese complex oxide. When lithium-nickel complex oxide is doped with cobalt, the mass ratio of cobalt relative to nickel is preferably 0.1 to 0.3.

The compounding ratio of lithium and cobalt-doped lithium-nickel complex oxide relative to lithium-manganese complex oxide is preferably less than 45 mass portions relative to 100 mass portions of lithium-manganese complex oxide.

With the above-described arrangement, it is possible to obtain a stable positive active material showing a large charging/discharging capacity.

Lithium-manganese complex oxide of the above described type is mixed with an electric conductibility providing agent such as a binder or acetylene black to form a positive electrode. The binder may be selected from polyvinylidene-fluoride (PVDF) and polytetrafluoroethylene (PTFE).

Aluminum foil is preferably used for the metal foil of the collector.

Graphite or amorphous carbon that can absorb and release lithium is mixed with a binder to form the negative electrode. The binder may be selected from polyvinylidene-fluoride (PVDF), polytetrafluoroethylene (PTFE) and rubber type binders. Copper foil is preferably used for the metal foil of the collector.

The separator may be made of a porous film or non-woven fabric of polyolefin such as polyethylene or polypropylene. Alternately, the separator may be made of a porous film having three-layered structure of polypropylene, polyethylene and polypropylene. The thickness of the separator is preferably between 10 µm and 30 µm.

The solvent of non-aqueous electrolyte can be selected from carbonates, ethers and ketones. Preferably, a compound is selected from a group of carbonates including ethylene carbonate (EC), propylene carbonate (PC) and γ-butyrolactone (GBL) as high dielectric constant solvent while another compound is selected from a group of diethyl carbonate (DEC), dimethyl carbonate (DMC), ethylmethyl carbonate (EMC) and esters as low viscosity solvent and a mixture solution thereof is used as solvent. Examples of preferable mixtures include EC+DEC, EC+EMC, EC+DMC, PC+DEC, PC+EMC, PC+DMC and PC+EC+DEC. The mixing ratio may be adjusted appropriately depending on the application. One or more than one additives may be added for the purpose of improving the decomposition of water in the electrolyte, oxidation resistance and safety.

At least a compound is selected from $LiBF_4$, $LiPF_4$, $LiClO_4$, $LiAsF_6$, $Li(CF_3SO_2)N$ and $Li(C_2F_5SO_2)_2N$. The use of a system containing $LiPF_6$ is preferable. The concentration of the supporting salt is preferably between 0.8 and 1.5 mol/L, more preferably between 0.9 and 1.2 mol/L.

The flexible coat to be used for a non-aqueous electrolyte secondary battery according to the present invention is formed by laying a metal foil, which is typically an aluminum foil, on a synthetic resin film showing an excellent gas and moisture intercepting property and made of polyester such as polyethyleneterephthalate, polybutyleneterephthalate, polyethylenenaphthalate or polybutylenenaphthalate, nylon 6, nylon 66, nylon 6/nylon MXD6 blend film and forming a thermally adhesive resin layer such as polyethylene.

Adhesive film treated by an easily adhering substance may be arranged on the bonding surface of the flexible coat. Easily adhering substances that can be used for the purpose of the present invention include ethylene-acrylate copolymer, unsaturated carbonic acid-denatured polyethylene and unsaturated carbonic acid-denatured polyethylene.

An auxiliary member having a recess to be engaged with the outgoing terminal may be arranged at the fused part of the outgoing terminal in order to prevent undulations from being produced by the outgoing terminal and the surface to be held in contact with the flexible coat for sealing may be made flat. Materials that can be used for the auxiliary member include polyolefins, polyesters and polyvinylidene-fluoride showing a softening temperature higher than that of polyethylene that is used on the bonding surface of the flexible coat under the conditions of thermal adhesion because such materials prevent the outgoing terminal from being deformed when depressed and can keep the profile.

EXAMPLE 1

Preparation of Unit Battery

Lithium-manganese oxide was used as positive active material and dry-mixed with an electric conductibility providing agent. The mixture was uniformly dispersed in N-methyl-2-pyrrolidone (NMP), to which PVDF had been dissolved as binder, to prepare slurry. The slurry was applied to the surface of a 20 μm-thick aluminum foil and the NMP was evaporated to produce a positive electrode sheet. The solid contents ratio in the positive electrode of lithium-manganese oxide:electric conductibility providing agent:PVDF was made equal to 90:6:4 by weight. The positive electrode sheet was punched to show a width of 55 mm and a height of 100 mm. The aluminum foil without applied slurry was punched to show a width of 10 mm and height of 15 mm as current taking out lead.

Graphite was selected as negative electrode material and uniformly dispersed in N-methyl-2-pyrrolidone (NMP), to which PVDF had been dissolved as binder, to prepare slurry. The slurry was applied to the surface of a 15 μm-thick copper foil and the NMP was evaporated to produce a negative electrode sheet. The solid contents ratio in the negative electrode of graphite:PVDF was made equal to 90:10 by weight. The negative electrode sheet was punched to show a width of 59 mm and a height of 104 mm. The copper foil without applied slurry was punched to show a width of 10 mm and height of 15 mm as current taking out lead.

A porous film separator having a three-layered structure of a 9 μm-thick polypropylene layer, a 7 μm-thick polyethylene layer and a 9 μm-thick polypropylene layer and showing a void ratio of 40% and a melting temperature of 160° C. was cut to show a width of 65 mm and a height of 110 mm.

Subsequently, five layers of the above described positive electrode sheet and six layers of the above-described negative electrode sheet were laid one on the other with the separator interposed between them. An aluminum tub and a nickel tub were bonded respectively to the positive electrode and the negative electrode by supersonic welding as external current taking out tubs. A laminate film embossed to match the profile of the obtained laminate and a flat laminate film were bonded respectively to the opposite sides of the obtained laminate by thermal adhesion. For the electrolyte, 1 mol /L $LiPF_6$ was used as supporting salt while a mixture solution of ethylene carbonate (EC):diethyl carbonate (DEC)=30:70 (by volume) was used as solvent.

The prepared unit battery was charged with a constant charging current of 0.3 C, or 0.3 times of the current for charging in an hour, to 4.2 V and subsequently switched to constant voltage charging and the charging operation was terminated when 10 hours passed since the start of the charging operation. The charged unit battery was checked for abnormality and then discharged for an electric current of 1 C down to 3 V.

Preparation of Stacked Battery Module

Twelve (12) unit batteries prepared in a manner as described above were laid one on the other and connected in series by means of a clad material formed by coating copper with nickel and a temperature fuse (EYP2ML092U: tradename, available from Panasonic) of activation temperature of 92° C. was arranged at the center of the opposite surfaces of the sixth and seventh unit batteries. One of the lead wires of the temperature fuse was connected to the positive electrode of the stacked battery module, while the other lead wire was connected to the charging terminal for supplying a charging current.

The discharging terminal to be connected to a discharging circuit was connected to the positive electrode terminal of the stacked battery module and the negative electrode terminal of the stacked battery module was connected to the common terminal to be connected to both a charging circuit and a discharging circuit.

Two 2 mm-thick aluminum plates were arranged at the respective opposite surfaces of the stacked battery module and rigidly held by a holding member.

Overcharging Test

A thermocouple was arranged between any two adjacently located unit batteries of the stacked battery module and an overcharging test was conducted by applying a voltage of 72 V with an electric current for charging the stacked battery module in an hour.

The separators of the unit batteries of a stacked battery modules are supposed to be softened by a temperature rise and eventually vitrified to fill the pores of the separators and block the passage of ions and hence the progress of the battery reaction.

However, the function of stopping the battery reaction may not operate satisfactorily depending on the progress of the exothermic reaction due to overcharging or the accumulation of heat, which by turn depends on the situation of heat generation, and heat may be generated abnormally. Thus, the stacked battery module was observed for abnormal heat generation.

In the overcharging test, no such abnormal heat generation was observed after the activation of the temperature fuse.

EXAMPLE 2

Unit batteries were prepared as in Example 1 except that polypropylene showing a melting temperature of 160° C. was used for the porous film separators and an overcharging test was conducted as in Example 1.

As a result, no abnormal heat generation was observed after the activation of the temperature fuse in the overcharging test.

EXAMPLE 3

Twelve unit batteries were prepared and connected in series as in Example 1 except that lithium manganese oxide and cobalt-doped lithium-nickel oxide expressed by composition formula of $LiNi_{0.8}Co_{0.2}O_2$ were mixed by a mass ratio of 8:2 to form a positive electrode and an overcharging test was conducted as in Example 1.

As a result, no abnormal heat generation was observed after the activation of the temperature fuse in the overcharging test.

COMPARATIVE EXAMPLE 1

An stacked battery module was prepared as in Example 1 except that no temperature fuses were arranged in the charging route and an overcharging test was conducted as in Example 1. As a result, the temperature rose above 160° C., which is the melting temperature of the separators, and the positive electrodes and the negative electrodes were short-circuited to give rise to abnormal generation of heat.

COMPARATIVE EXAMPLE 2

An stacked battery module was prepared as in Example 1 except that a temperature fuses (EYP2ML102U: tradename, available from Panasonic) of activation temperature of 102° C. were used and an overcharging test was conducted as in Example 1.

As a result, the temperature fuses were activated and the stacked battery module was no longer charged but the temperature rise continued to abnormally generate heat. Although the cause of this phenomenon is not clear, it may be safe to assume that the exothermic reaction that took place on the surfaces of the electrodes due to overcharging did not stop quickly and the materials of the positive and negative electrodes continued to exothermally react by themselves so that the temperature rise went on after the input current was stopped.

COMPARATIVE EXAMPLE 3

An stacked battery module was prepared as in Example 1 except that polyethylene was used for the porous film separators. The temperature fuses were activated at 92° C. but the temperature continued to rise and eventually went above the melting temperature of 120° C. of the polyethylene separators. Then, the positive electrodes and the negative electrodes were short-circuited to give rise to abnormal generation of heat.

COMPARATIVE EXAMPLE 4

An stacked battery module was prepared as in Example 1 except that lithium-cobalt oxide was used for the positive electrodes. Abnormal generation of heat took place due to overcharging.

What is claimed is:

1. A stacked battery module formed by laying a plurality of unit batteries of non-aqueous electrolyte batteries in layers with the surfaces thereof having a large area disposed vis-à-vis and electrically connecting them in series;
    a temperature fuse being arranged in a central part of the stacked battery module with one of its terminals connected to either the positive electrode terminal or the negative electrode terminal of the stacked battery module and the other terminal connected to a charging terminal for supplying a charging current in a charging operation; and
    one of the terminals of the stacked battery module being connected to a discharging terminal for taking out a discharging current in a discharging operation, the other terminal of the stacked battery module being a common terminal for charging and discharging operations,
    wherein the temperature fuse is arranged in a temperature fuse mount arranged between the oppositely disposed surfaces of layers of unit batteries.

2. The stacked battery module according to claim 1, wherein
    the temperature fuse is activated at a temperature level higher than 70° C. but lower than the melting temperature of the separator of the stacked battery module by 60° C.

3. The stacked battery module according to claim 1 wherein
    the unit batteries are covered and hermitically sealed by flexible film.

4. The stacked battery module according to claim 1, wherein
    the unit batteries are lithium ion secondary batteries.

5. The stacked battery module according to claim 4, wherein
    the lithium ion secondary batteries contain lithium-manganese complex oxide as positive active material.

6. The stacked battery module according to claim 1, wherein
    the separator for separating the positive electrode and the negative electrode is a single layer of polypropylene or a three-layered structure of polypropylene, polyethylene and polypropylene.

7. An battery pack formed by holding at least a stacked battery module by means of a plate-shaped body at the opposite ends thereof;
    the stacked battery module being formed by laying a plurality of unit batteries of non-aqueous electrolyte batteries in layers with the surfaces thereof having a large area disposed vis-à-vis and electrically connecting them in series;
    a temperature fuse being arranged in a central part of the stacked battery module with one of its terminals connected to either the positive electrode terminal or the negative electrode terminal of the stacked battery module and the other terminal connected to a charging terminal for supplying a charging current in a charging operation; and
    one of the terminals of the stacked battery module being connected to a discharging terminal for taking out a discharging current in a discharging operation, the other terminal of the stacked battery module being a common terminal for both charging and discharging operations,
    wherein the temperature fuse is arranged in a temperature fuse mount arranged between the oppositely disposed surfaces of layers of unit batteries.

8. The battery pack according to claim 7, further comprising:
    discharging means for discharging the charging energy of the batteries after the activation of the temperature fuse.

9. The battery pack according to claim 7, wherein
    two stacked battery modules are connected in series, one of the stacked battery modules being connected to the temperature fuse at the positive electrode terminal thereof, the other stacked battery module being connected to the temperature fuse at the negative electrode terminal thereof.

10. The battery pack according to claim 7, wherein
    stacked battery modules connected to the temperature fuse at the positive electrode terminal thereof and stacked battery module connected to the temperature fuse at the negative electrode thereof are arranged alternately, the common terminal of the stacked battery module arranged at an end is connected to the common terminal of the adjacently arranged stacked battery module so as to sequentially connect the charging terminals and the discharging terminals or the common terminals of adjacently arranged stacked battery modules, and charging/discharging switching means for switching from a charging operation to a discharging operation and vice versa is provided at the spot for connecting the charging terminals and the discharging terminals.

* * * * *